Patented Jan. 31, 1928.

1,657,685

UNITED STATES PATENT OFFICE.

BRADFORD R. PHILLIPS, OF HEALDTON, OKLAHOMA.

COMPOSITION OF MATTER FOR USE AS A BELT DRESSING.

No Drawing.   Application filed March 19, 1926.  Serial No. 96,004.

This invention relates to a composition of matter for use as a dressing on machinery belts, clutch bands, brake bands and the like, one of the objects being to provide an efficient preparation of this kind which can be applied readily to the surface of the belt or the like and will operate efficiently to prevent slipping and reduce wear.

A further object is to provide a preparation of this kind which can be used on all kinds of beltings and remains efficient through long intervals of time.

A still further object is to provide a composition of matter which will not "build up" or form lumps on a belt or pulley and will not disintegrate a leather belt or pull the rubber from belts containing rubber as an ingredient.

A further object is to provide a composition of matter which will increase the traction of a belt, brake band or the like and will prevent the same from squeaking when the belt or band is applied to a moving surface.

With the foregoing and other objects in view which will appear as the description proceeds, the invention consists of the following ingredients, to wit:—

|  | Per cent by volume. |
|---|---|
| Rubber solution | 83 |
| Dextrose | 15 |
| Liquid styrax (sweet gum) | 2 |

It is to be understood that the foregoing proportions are not significant as they can be varied if desired for meeting different requirements. The rubber is dissolved, while heated, in a desired amount of turpentine, pinesol or other pine distillate. In preparing this solution one gallon of turpentine or other pine distillate such as "pinesol" is added to 80 pounds of molten rubber at a temperature from 150 to 170 degrees centigrade. This mixture is briskly stirred and the substance produced constitutes more than merely melted rubber as it remains in a liquid state after it has thoroughly cooled whereas rubber will become somewhat of a plastic mass when it returns to normal temperature provided turpentine has not been added. The viscosity of the product may be varied by increasing or reducing the amount of solvent used. The dextrose is added to the solution after which the liquid styrax is mixed therewith. The rubber constitutes the base of the composition, gives the preparation its traction power and causes it to form a film over the surface to which it is applied. The dextrose gives the preparation its penetrating characteristics so that it will freely enter the pores of the belt or the like and keep the structure soft and pliable under the most severe weather conditions. The liquid styrax (sweet gum) is used because of its pleasant odor and because it insures better adherence of the composition to a leather belt than would otherwise be possible.

The composition of matter produced from the ingredients above stated is applied to the belt of leather or fabric or to the clutch or brake band and will form a thin film or coating over the active surface thereof. This film sustains the wear and prevents the belt or the like from slipping upon the surface engaged thereby. The efficiency of the dressing remains constant under all kinds of weather conditions and as long as the dressing lasts upon the belt and, as before stated, the dressing will not form lumps on the belt or band or upon the pulley or the like engaged thereby nor will it tend to pull or disintegrate the belt or the like. While the dressing is designed especially for use on drive belts of machinery, it has been found very efficient when used on friction clutches and on the brakes of automobiles. Obviously it can be used on any other structures where it is desired to prevent relatively movable cooperating parts from slipping relative to each other.

What is claimed is:

A composition of matter for use as a belt dressing or the like including rubber dissolved in a pine distillate and dextrose, to which is added liquid styrax.

In testimony that I claim the foregoing as my own, I have hereto affixed my signature.

BRADFORD R. PHILLIPS.